United States Patent
Servant

(10) Patent No.: US 8,721,256 B2
(45) Date of Patent: May 13, 2014

(54) TURBOMACHINE OPTIMIZED FOR FASTENING A ROTARY SHAFT BEARING, A METHOD OF MOUNTING SAID BEARING ON SAID TURBOMACHINE

(75) Inventor: Regis Eugene Henri Servant, Vigneux sur Seine (FR)

(73) Assignee: SNECMA, Paris (FR)

( * ) Notice: Subject to any disclaimer, the term of this patent is extended or adjusted under 35 U.S.C. 154(b) by 501 days.

(21) Appl. No.: 13/021,299

(22) Filed: Feb. 4, 2011

(65) Prior Publication Data

US 2011/0189012 A1 Aug. 4, 2011

(30) Foreign Application Priority Data

Feb. 4, 2010 (FR) ..................................... 10 50782

(51) Int. Cl.
*F01D 25/16* (2006.01)
(52) U.S. Cl.
USPC ................ 415/1; 415/142; 415/229; 411/398
(58) Field of Classification Search
USPC ..................... 415/142, 229, 1; 411/398, 107; 29/889.2
See application file for complete search history.

(56) References Cited

U.S. PATENT DOCUMENTS

2003/0053882 A1* 3/2003 Reuter .......................... 411/107
2009/0116930 A1* 5/2009 Reimler ........................ 411/337

FOREIGN PATENT DOCUMENTS

EP 0 206 243 A1 12/1986
GB 1 418 907 A 12/1975

OTHER PUBLICATIONS

French Preliminary Search Report issued on Aug. 27, 2010 in corresponding French Application No. 10 50782 filed Feb. 4, 2010 (with English Translation of Category of Cited Documents).

* cited by examiner

*Primary Examiner* — Edward Look
*Assistant Examiner* — William Grigos
(74) *Attorney, Agent, or Firm* — Oblon, Spivak, McClelland, Maier & Neustadt, L.L.P.

(57) ABSTRACT

A turbomachine including a shaft, a bearing for supporting the shaft and including an outer ring, and a support for the bearing, the support having a flange to which the outer ring is fastened by fasteners, is provided. Each fastener includes a fastener bolt and a nut screwed together. The turbomachine further includes, for each fastener, a position-retention device for retaining the bolt, and suitable for retaining the bolt in a position that is stationary relative to the bearing support or the outer ring, even in the absence of the nut. The head of the fastener bolt and the position-retention device may be of small dimensions, thereby enabling the fastening of the flange to the bearing support to be optimized, and in particular enabling the weight of the fastening to be optimized. A method of mounting the bearing of the turbomachine is also provided.

11 Claims, 3 Drawing Sheets

TURBOMACHINE OPTIMIZED FOR FASTENING A ROTARY SHAFT BEARING, A METHOD OF MOUNTING SAID BEARING ON SAID TURBOMACHINE

FIELD OF THE INVENTION

The invention relates to a turbomachine comprising a rotary shaft held by a bearing having an outer ring; the bearing is supported by a bearing support; and the outer ring of the bearing is fastened to a flange of the bearing support by bolt fasteners.

More precisely, the invention relates to turbomachines of this type in which fastening the outer ring of the bearing to the bearing support is problematic because some of the operations for mounting the bearing are not possible for reasons of insufficient space.

BACKGROUND OF THE INVENTION

Because of the structure of the turbomachine and/or its environment and/or its mounting sequence, it can happen that when it is necessary to fasten the outer ring of the bearing to the bearing support, access to one side of the assembly is no longer possible.

The assembly of the outer ring of the bearing and the flange to which it is mounted generally has the overall shape of a disk. Thus, the problematic situation in question is that in which it is possible to access the assembly from only one side of the disk, with access from the other side being impossible. The invention relates equally to the situation in which access is possible from the bearing support side and to the situation in which access is possible from the outer ring side.

Such a difficulty, or at least particularity, in the sequence of mounting a turbomachine shaft bearing arises in particular in the field of aviation, in certain turbomachines that are fitted with decoupling devices in their front portions. Such turbomachines are described in French patent FR 2 845 126.

FIG. 1 shows the arrangement of the front portion of such a turbomachine. In that turbomachine 6, a decoupling device is arranged at the front. That device serves to decouple the fan (not shown), which is connected to the low pressure shaft 10, from the remainder of the turbomachine for the purpose of limiting the damage that is caused by a failure occurring in the fan and causing unbalance to appear.

The fan is fastened by a flange 8 to the front of the low pressure shaft 10, which shaft is held so as to be rotatable about its axis X by a first bearing 12 behind the fan, and a second bearing 14 behind the first bearing (the front of the turbomachine 6 is on the left in FIG. 1).

The first bearing 12 is carried by a shroud 16 of generally conical shape that surrounds the shaft 10 and that extends rearwards from the first bearing 12 to a bearing support 20. The shroud 16 is fastened to the bearing support 20 by bolts 22.

The bearing support 20 is itself fastened to a stationary casing 24 of the turbomachine, mainly by means of bolts 26.

The bearing support 20 serves to fasten and hold in position not only the first bearing 12 (via the shroud 16), but also the second bearing 14. More precisely, the outer ring 30 of the second bearing 14 is fastened to the bearing support 20 by means of a set of bolt fasteners 40 of axes parallel to the axis X and regularly distributed around the circumferential of the outer ring 30.

In known manner, the outer ring 30 is of annular shape, surrounding and holding a set of rollers 31 on its radially outer side. On its radially inner side, the bearing 14 has an inner ring 33 that holds the rollers 31 on the inside.

The bearing support 20 comprises an outer annular flange 34 and an inner annular flange 36 connected together by spokes 48.

Since the shaft 10 having the fan fastened thereto is subjected to very large forces, the number of spokes 48 serving to hold the flange 36 relative to the flange 34 is quite high. Conversely, since the bearing support 20 is a part on board an airplane, its weight needs to be as light as possible. Thus, large passages 32 are arranged between the outer and inner flanges 34 and 36 of the bearing support 20 and between the spokes 48; these passages 32 are also essential for ventilating the enclosure of the turbomachine.

The outer flange 34 has two series of holes 38 and 42 that receive the above-mentioned bolts 26 and 22 respectively.

The inner flange 36 enables the outer ring 30 to be fastened, thereby holding the rotary shaft 10 at the bearing 14.

In order to fasten the ring 30, the flange 36 and the ring 30 have a series of identical through passages 44 through which the bolt fasteners 40 are passed in order to secure the bearing support 20 and the ring 30 rigidly together.

Mounting the bearing 14 of the turbomachine 6 presents the above-mentioned particularity: during such mounting, the front portion of the turbomachine (low pressure shaft 10, first bearing 12, shroud 16, bearing support 20) is assembled before the outer ring 30 is mounted. It follows that while the outer ring 30 is being mounted it is possible to access the bearing support 20 and the ring 30 from beside the ring only; conversely, at this stage, it is not possible to access the front side of the bearing support. It is therefore no longer possible to act on the front portions of the bolt fasteners 40, i.e. those portions that are on the front side; for example it is not possible to prevent the front portion of the bolt fastener 40 from turning in order to screw together the front portion of the bolt fastener and its rear portion.

The technical solution used in the prior art for remedying this difficulty can be seen in FIGS. 1 and 2. It consists in using bolt fasteners 40 comprising two portions, namely a captive nut 50 (front portion) and a fastener bolt 46 (rear portion). The bolt fastener may also include secondary parts such as washers, etc.

The rear portion of the fastener 40 is a fastener bolt 46 having a head at its rear end and a shank extending forwards, with the end of the shank being threaded. This fastener bolt 46 is designed to act as a fuse in shear, should it be necessary to actuate the decoupling device and release the shroud 16 from its fastening to the bearing support 20.

Furthermore, the front portion of the fastener 40 is a captive nut 50 that is fixed to a collar 58 provided on the bearing support 20.

The nut 50 is a standard nut and it is said to be "captive" because it is prevented from turning, or held "captive", by a nut support 54 made of sheet metal that holds it in position. The nut support 54 enables the nut 50 to be fixed to the bearing support and enables it to be held in position until the moment when it is finally fastened as a result of being screwed onto the bolt 46. During this screw fastening operation, the nut support 54 also ensures that the nut 50 does not turn while the bolt 46 is being screwed into it.

In order to keep the nut 50 in position, the nut support 54 is itself fixed to the bearing support 20. This operation of fixing the nut 50 is performed before the bearing support 20 is mounted on the front portion of the turbomachine 6, at a time when the front side of the bearing support 20 is still accessible. In order to avoid any turning of the captive nut 50 before the bolts 46 are screwed into them, the supports 54 are fixed by means of two rivets (a single rivet would not suffice).

In that prior system, the threads in the nuts 50 are located inside them: as a result there is little risk of damaging those threads in the period between mounting the nuts 50 and subsequently screwing the bolts 46 into them.

It should also be observed that the nut 50 is held by the support 54 with a small amount of clearance, perpendicularly to the axis X. This clearance is necessary. While the ring 30 is being mounted on the bearing support, the ring 30 is initially put into an almost final position by putting it into place using the rollers 31. Thereafter, the ring is fastened by putting the various bolts 46 into place and screwing them into the corresponding nuts 50. When the bolts 46 are caused to penetrate into the passages 44 provided in the bearing support, the ring 30 takes up its final position, the passages 44 being provided with just sufficient clearance to enable the bolts 46 to pass through them.

When the bolts 46 begin to be screwed into the nuts 50, the nuts shift a little so that their respective axes coincide with the axes of the bolts. This adjustment of the positions of the nut axes is made possible by the above-mentioned small clearance between the nuts and the supports 54.

The above-described arrangement of the fasteners 40 enables the outer ring 30 to be mounted but it presents various drawbacks.

In particular, the collar 58 is formed on the front of the bearing support 20. The nuts 50 are fixed to the front of the bearing support, in front of the spokes 48. As a result, the bearing support 20 and the ring 30 are pierced over a great length by the through passages 44. The presence of these passages makes it necessary to provide bulges in the spokes 48: the spokes are thus of swollen shape along the passages 44 in order to be sufficiently strong.

The length of the bolts 46 together with the amount of swelling made necessary by the passages 44 result in the fastening of the ring 30 on the support 20 presenting a weight that is not negligible.

Furthermore, the prior mounting of nuts on the bearing support is an operation that is relatively lengthy because of the need to fasten two rivets for each nut.

OBJECTS AND SUMMARY OF THE INVENTION

A first object of the invention is thus to provide a turbomachine having a rotary shaft, a shaft support bearing including an outer ring, and a support for said bearing having a flange to which the outer ring is fastened by means of a plurality of bolt fasteners; each fastener comprising two portions that are screwed together; the turbomachine also including, for each fastener, position-retention means for retaining a first portion of the fastener in position and suitable for retaining it substantially in a stationary position relative to the bearing support, even in the absence of the second fastener portion;

in which turbomachine the operations of mounting the outer ring on the bearing support are relatively quick; in which mounting proper of the outer ring on the bearing support is possible even though access is then possible to only one side during the operation of assembling those two parts together; but in which the weight of the members for fastening the outer ring to the bearing support remains moderate.

This object is achieved by the fact that the first portion is a fastener bolt and the second portion is a nut.

Thus, instead of beginning by fixing a (captive) nut to the bearing support onto which the nut is to be mounted, a bolt is fixed thereto.

The difference is that the fastener bolt, because it includes a shank, is automatically centered in the passage provided through the bearing support for passing the bolt. The shank of the fastener bolt thus serves to retain the bolt in position to some extent. As a result, in the invention, instead of it being necessary to have two fixing points as for the above-described nut 50, a single fixing point suffices for ensuring that the fastener bolt is retained in position until the nut is screwed thereon.

Consequently, in the invention, the means for retaining the fastener bolt in position are simpler and more compact than those used in the past (the nut support 54 fastened to a special collar). Thus, the fasteners 40 may be positioned in such a manner as to reduce the weight of the members for fastening the ring 30 to the support 20.

In an embodiment, the position-retention means comprise at least one retention element fixed to the bearing support and retaining the fastener bolt thereon before the nut is screwed onto the fastener bolt. The retention element may be a screw screwed into the bearing support, a rivet, or indeed a fastener comprising a nut and a bolt. The retention element serves to connect together the bearing support and the fastener bolt, and in particular to retain them in the axial direction (axis X).

In an embodiment of the invention, at least one retention element enables the fastener bolt to be held in a desired angular position while the nut is being screwed on. The retention element thus acts not only to perform a retention function prior to screwing the nut onto the fastener bolt, but also an antirotation function during screw fastening, so as to prevent the bolt from turning about its axis.

In an embodiment, the retention element comprises a single fixing rod that penetrates into the bearing support or a part that is secured thereto. Because the shank of the bolt centers the fastener bolt, a single fixing rod suffices to hold the fastener bolt in position (preventing axial movement suffices). The simplest arrangement is for the fixing rod to pass through the head of the fastener bolt.

Preferably, the axis of the fixing rod is off-centered or offset relative to the axis of the fastener bolt. The fixing rod thus ensures that the fastener bolt does not turn about its own axis. By way of example, the fixing rod may be the shank of a rivet or of a fixing bolt. Preferably, this fixing bolt and the fastener bolt are braked bolts.

In an embodiment, the head of the fastener bolt is flat and presents a hole to one side the axis of the fastener bolt for the purpose of passing the fixing rod of a retention element.

In an embodiment, the fixing rod passes through the hole in the head of the fastener bolt with clearance. Thus, the distance between the fixing rod and the fastener bolt changes very slightly while they are being mounted on the bearing support. This possibility of adjusting the distance between the fixing rod and the fastener bolt serves to reduce manufacturing precision requirements relating to the retention element and/or to the fastener bolt. For example, it makes it possible to avoid specifying a value for the distance between these two elements. In contrast, when the retention element and the fastener bolt are mounted on the support, the distance between them is determined by the distance between the axis of the fastener bolt and the position of the point where the retention element is fastened to the bearing support.

In an embodiment, the head of the fastener bolt presents a radius in at least one radial direction that is less than the diameter of the shank of the fastener bolt.

In an embodiment, a head of the fastener bolt is prevented from turning by a surface of the bearing support. Thus, the means for retaining the fastener bolt in position on the first portion are subjected to mechanical stress only prior to screwing the nut onto the fastener bolt, thus making it possible to reduce the dimensioning of the means for maintaining the fastener bolt in position.

The invention also provides a fastener comprising a fastener bolt and a nut suitable for being screwed together to contribute to retaining a turbomachine bearing ring as described above in position on a bearing support of the turbomachine; the fastener enabling an outer ring of the bearing to be fastened to a bearing support while access to those two elements being fastened together (constituting an assembly that is generally disk-shaped) is possible from one side only, the fastener enabling fastening to be achieved in such a manner that the total weight of the fastening of the outer ring to the bearing support remains moderate.

This object is achieved by the fact that the fastener also includes a fixing bolt, and that a head of the fastener bolt presents a passage that is offset from the axis of the fastener bolt and through which said fixing bolt passes.

Thus, the fastener bolts may be put into position and fixed to the bearing support by means of the fixing bolts. This first operation takes place before the outer ring is assembled to the bearing support. Subsequently, the outer ring is positioned on the bearing support, and the nuts are screwed onto the fastener bolts, thereby fastening the outer ring on the bearing support.

A third object of the invention is to propose a method of mounting a bearing on a bearing support placed around a rotary shaft of a turbomachine, said bearing including an outer ring, which method is relatively fast, and in which the outer ring can be mounted on the bearing support even though access is possible to one side only during the operation of fastening those two parts together; the method requiring fastening of moderate weight only for fastening the outer ring to the bearing support.

This object is achieved by the fact that the method comprises the following steps:

a) fixing a plurality of fastener bolts to the bearing support using position-retention means that retain said bolts in a position that is substantially stationary relative to the bearing support, even in the absence of nuts;

b) positioning the outer ring on a flange of the bearing support; and then c) fastening the outer ring to the flange by screwing a plurality of nuts on said fastener bolts.

Because of the position-retention means, steps b) and c) of positioning and fastening the outer ring can be performed while having access to only one side of the bearing support, opposite from the side of the bearing support that has the fastener screws 146 fixed thereto.

Preferably, in the method, during step a), said fastener bolts are fixed using a plurality of retention elements, each retention element being fixed to the bearing support and retaining a fastener bolt on the bearing support before a nut is screwed onto said bolt.

BRIEF DESCRIPTION OF THE DRAWINGS

The invention can be well understood and its advantages appear better on reading the following detailed description of embodiments given as non-limiting examples. The description refers to the accompanying drawings, in which.

MORE DETAILED DESCRIPTION

Figure 3:
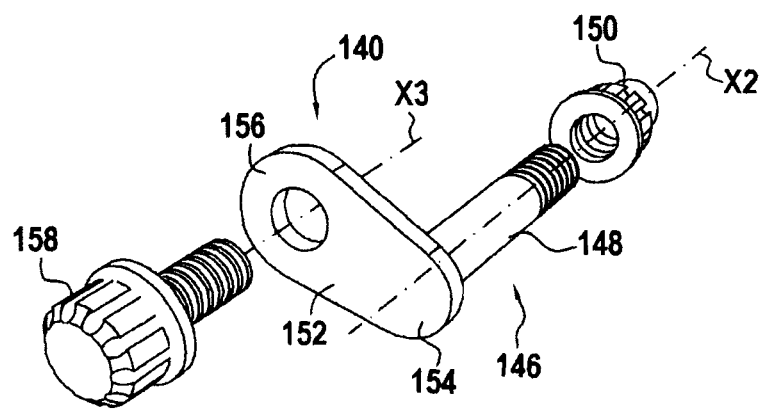
FIG. 3 is a perspective view of a fastener with a fastener bolt in an embodiment of the invention.
Figure 4:
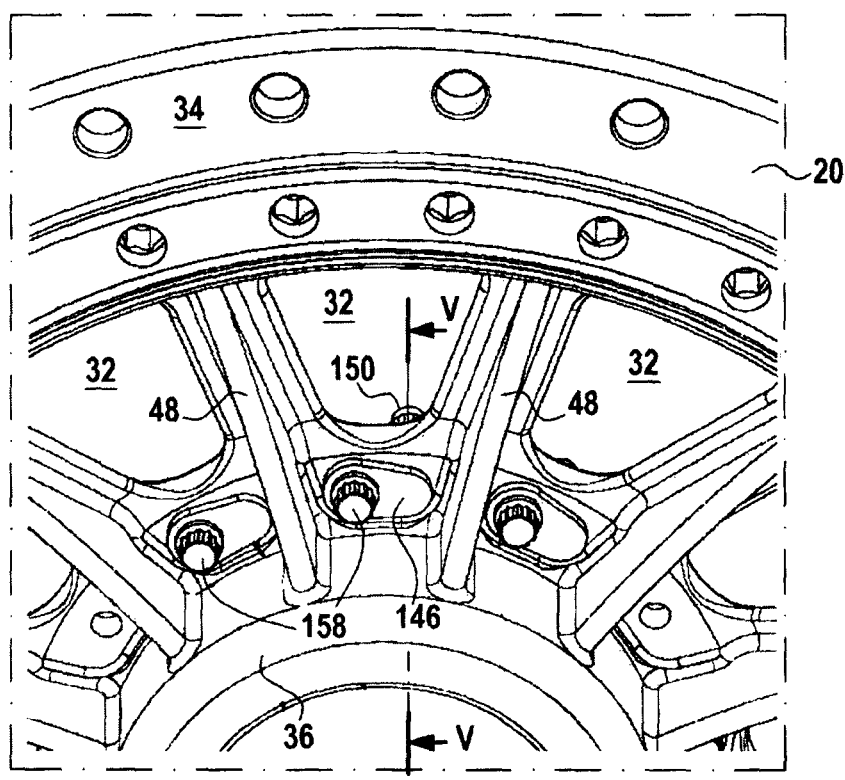
FIG. 4 is a perspective view of a portion of a turbomachine arranged in accordance with the invention, using the fastener shown in FIG. 3.
Figure 5:
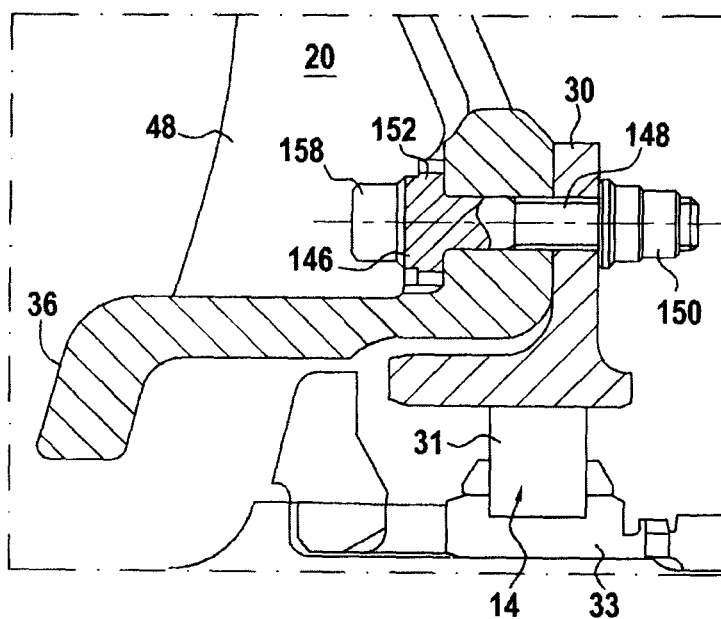
FIG. 5 is a fragmentary axial section view of the fastening of a bearing to a bearing support in a turbomachine that is arranged in accordance with the invention.

With reference to FIGS. 3 to 5, there follows a description of a turbomachine of the invention and in particular of the arrangement of the fasteners used for fastening the inner flange 36 to the bearing support 20 of the machine.

Figure 1:
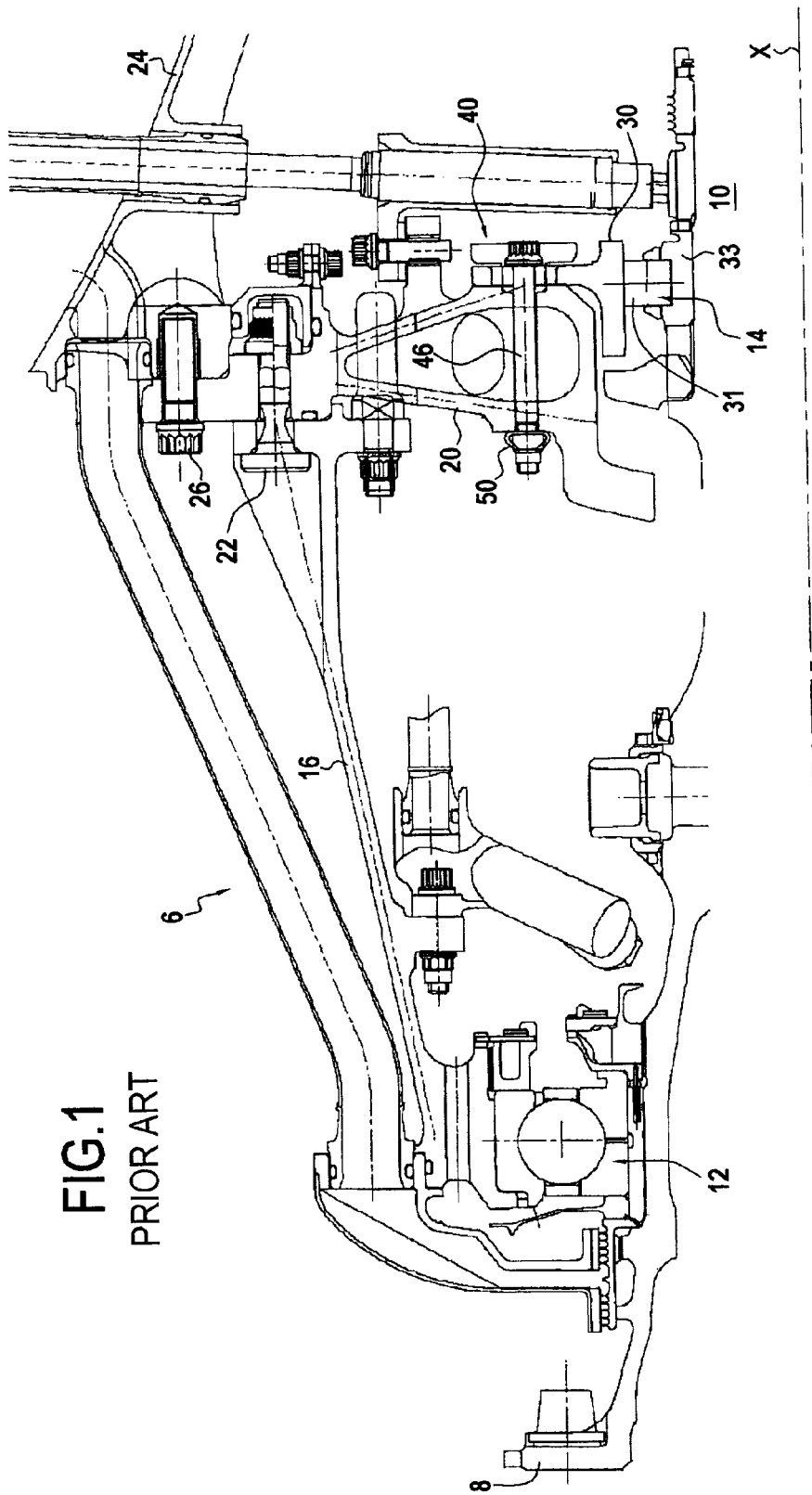
FIG. 1, described above, is a fragmentary axial section view of the front portion of a turbomachine, in a prior art embodiment.
Figure 2:
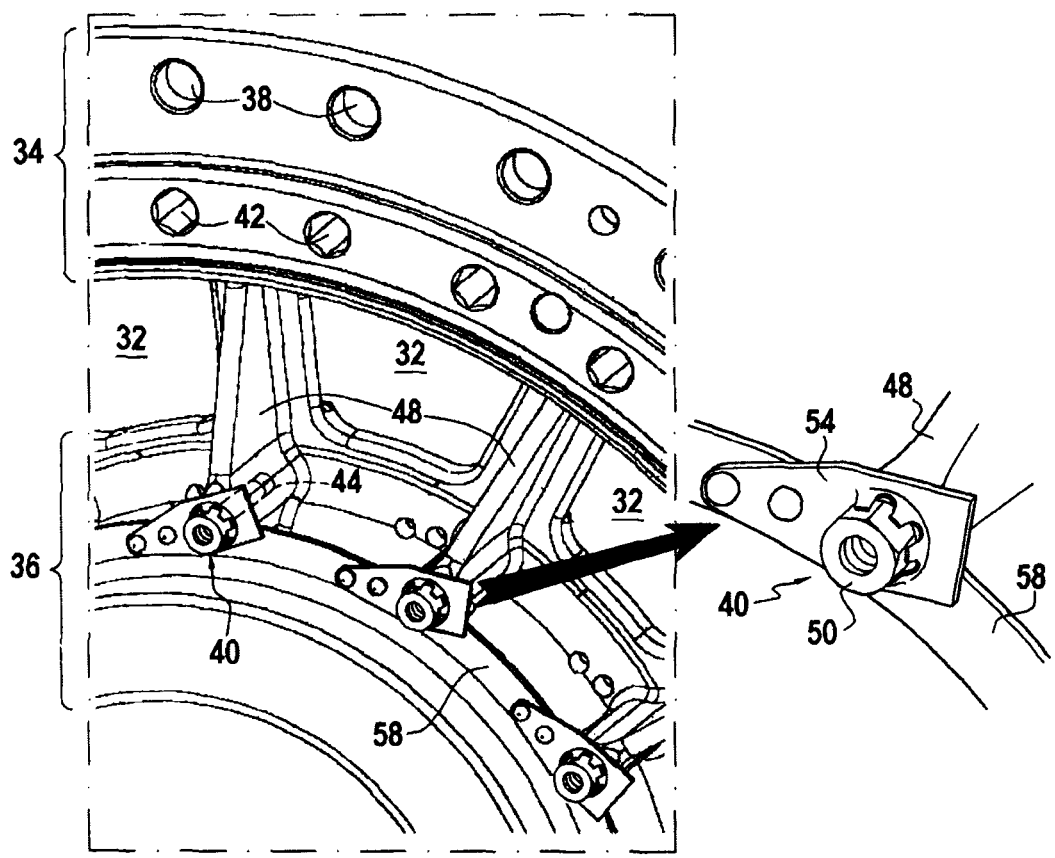
FIG. 2, described above, is a fragmentary perspective view of the FIG. 1 turbomachine.

The general arrangement of the turbomachine is identical to that of the turbomachine 6 described with reference to FIGS. 1 and 2. The improvement provided by the invention relates solely to the fastening of the outer ring 30 to the bearing support 20. In this embodiment, the fastening is provided by means of bolt fasteners 140.

Like the fasteners 40, each fastener 140 includes a shearable bolt.

The bearing support 20 includes a ring-shape portion in which the fasteners 140 are fastened.

Each fastener 140 extends in a through passage formed through the ring-shaped portion of the bearing support 20 and the outer ring 30. Each fastener 140 comprises a bolt 146 and a nut 150. The bolt 146 has a shank 148 of axis X2 and a flat head 152. The shank 148 has a cylindrical first portion with a smooth wall and a threaded end portion for being screwed into the inside thread of the nut 150.

The flat head 152 extends in a plane perpendicular to the axis X2. It has a bearing first portion 154 that extends around and close to the end of the shank 148 and is in the form of a portion of a disk, and a second portion constituting an appendage 156 that is designed to pass a fixing bolt 158. The fixing bolt 158, of axis X3, is designed to pass through a hole pierced in the appendage 156. The axes X, X2, and X3 are parallel and extend in the direction of the rotary shaft.

The role of the fixing bolt 158 is as follows: prior to mounting the ring 30 on the bearing support 20, the various fastener bolts 146 are fixed to the bearing support 20. For this purpose, each fastener bolt 146 is fixed to the bearing support by screwing a fixing bolt 158 into the bearing support through the hole in the appendage 156 of the bolt 146. The result that is obtained is shown in FIG. 4. The fastener bolts 146 pass through the ring-shaped portion of the bearing support; the heads of the fastener bolts are fixed against a first side of the ring-shaped portion (on the left in FIG. 5) by means of the bolts 158.

Subsequently, the ring 30 is put into place on the flange 36 of the bearing support and it is fastened by screwing the nuts 150 onto the bolts 146. For this purpose, the ring 30 include holes that are positioned in such a manner that the bolts 146 mounted on the bearing support 20 can pass through the holes in order to have the nuts 150 screwed onto them. The nuts 150 are screwed on from the second side of said ring-shaped portion of the bearing support (on the right in FIG. 5). During this screw-fastening step, the bolts 146 are prevented both from dropping out (forwards or to the left in FIG. 5) and from turning by the fixing bolts 158 that hold the heads 152 of the bolts 146. Thus, this second step may be performed at a later stage while mounting the turbomachine, in particular once it is no longer possible to access the first side of the ring-shaped portion of the bearing support.

Furthermore, as mentioned above, the bearing support 20 includes spokes 48. The fasteners 140 (or at least one fastener) are located between these spokes. Thus, the passages for the fasteners 140 advantageously pass through portions of the bearing support 20 that are of smaller thickness, and the length of the bolts 146 is minimized.

It should be observed that in the mounted position, the heads 152 of the bolts 146 are placed in countersinks machined in the bearing support 20 (FIG. 4).

In another embodiment of the invention, the edges of these countersinks may be used for preventing the heads 152 from turning and thus for preventing the bolts 146 from turning. Under such circumstances, the fixing bolts 158 serve only to provide an axial retention role that consists in preventing any movement of the bolts 146 along their axes X2; they then do not have any antirotation function to perform, i.e. they do not need to prevent the bolts 146 from turning while the nuts 150 are being screwed onto them.

What is claimed is:

1. A turbomachine comprising:
   a rotary shaft;
   a shaft support bearing including an outer ring;
   a support for said bearing having a flange:
   a plurality of bolt fasteners which fastens the flange of the support to the outer ring, each fastener comprising first and second portions that are screwed together; and
   for each fastener position-retention means for retaining a first portion of the fastener in position and suitable for retaining the fastener substantially in a stationary position relative to the bearing support, even in the absence of the second fastener portion,
   wherein said first portion comprises a fastener bolt and the second portion being a nut, and
   wherein said fastener position-retention means includes a fixing bolt, and a head of the fastener bolt presenting a passage that is offset from an axis of the fastener bolt and through which said fixing bolt passes.

2. A turbomachine according to claim 1, wherein the bearing support includes spokes and said at least one fastener is located between the spokes.

3. A turbomachine according to claim 1, wherein said fixing bolt is fastened to the bearing support and retains the fastener bolt thereon before the nut is screwed onto the fastener bolt.

4. A turbomachine according to claim 3, wherein said fixing bolt enables the fastener bolt to be held in a desired angular position while the nut is being screwed on.

5. A turbomachine according to claim 3, wherein said fixing bolt comprises a single fixing rod penetrating in the bearing support or a part secured thereto, through a head of the fastener bolt.

6. A turbomachine according to claim 5, wherein the head of the fastener bolt is flat and presents a hole on one side relative to the axis of the fastener bolt for the purpose of passing the fixing rod of a said fixing bolt.

7. A turbomachine according to claim 5, wherein the fixing rod passes through the hole in the head of the fastener bolt with clearance.

8. A turbomachine according to claim 1, wherein a head of the fastener bolt is prevented from turning by a surface of the bearing support.

9. A turbomachine according to claim 1, wherein the head of the fastener bolt is flat and extends in a plane perpendicular to the axis of the fastener bolt, and a shank of the fastener bolt extends from the head of the fastener bolt along the axis of the fastener bolt.

10. A method of mounting a bearing on a bearing support placed around a rotary shaft of a turbomachine, said bearing including an outer ring, said method comprising:
    fixing a plurality of fastener bolts to the bearing support using position-retention means that retain said bolts in a position that is substantially stationary relative to the bearing support, even in the absence of nuts, wherein said fastener bolts are fixed using a plurality of fixing bolts, each fixing bolt being fixed to the bearing support and retaining a fastener bolt on the bearing support before a nut is screwed onto said bolt, and wherein a head of each of said fastener bolts presents a passage that is offset from an axis of the fastener bolt and through which one of said fixing bolts passes;
    positioning the outer ring on a flange of the bearing support; and
    fastening the outer ring to the flange by screwing a plurality of nuts on said fastener bolts.

11. A method according to claim 10, wherein the head of the fastener bolt is flat and extends in a plane perpendicular to the axis of the fastener bolt, and a shank of the fastener bolt extends from the head of the fastener bolt along the axis of the fastener bolt.

* * * * *